United States Patent [19]

Huang et al.

[11] Patent Number: 4,457,685
[45] Date of Patent: Jul. 3, 1984

[54] EXTRUSION DIE FOR SHAPED EXTRUDATE

[75] Inventors: Yun-Yang Huang, Voorhees; Edward J. Rosinski, Pedricktown, both of N.J.

[73] Assignee: Mobil Oil Corporation, New York, N.Y.

[21] Appl. No.: 336,741

[22] Filed: Jan. 4, 1982

[51] Int. Cl.³ .............................................. A01J 21/00
[52] U.S. Cl. .................................... 425/461; 264/177 F; 425/464
[58] Field of Search ............... 264/177 F, 177 R, 171; 425/465, 464, 466, 461, 382 H, 192

[56] References Cited

U.S. PATENT DOCUMENTS

| 1,453,048 | 4/1923 | Kraft et al. | 425/464 |
| 2,013,688 | 9/1935 | Krasella | 425/464 |
| 2,230,309 | 2/1941 | Reed | 264/177 R |
| 2,750,631 | 6/1956 | Johnson | 264/177 R |
| 3,070,840 | 1/1963 | Mercer | 425/382 N |
| 3,164,947 | 1/1965 | Gaston | 264/177 R |
| 3,274,315 | 9/1966 | Kawamura | 264/177 R |
| 3,410,933 | 11/1968 | Moseley | 425/465 |
| 3,492,692 | 2/1970 | Soda et al. | 264/171 |
| 3,790,654 | 2/1974 | Bagley | 264/177 R |
| 3,911,070 | 10/1975 | Lundsager | 264/177 R |
| 3,952,127 | 4/1976 | Orr | 425/382 N |
| 4,083,914 | 4/1978 | Schippers et al. | 264/177 R |

FOREIGN PATENT DOCUMENTS

| 2134874 | 4/1971 | France | 425/465 |
| 45-41049 | 12/1970 | Japan | 264/177 F |
| 46-37774 | 11/1971 | Japan | 264/177 F |

*Primary Examiner*—Jay H. Woo
*Attorney, Agent, or Firm*—Alexander J. McKillop; Michael G. Gilman; Charles J. Speciale

[57] ABSTRACT

The present invention is direction to a unique extrusion die which may be employed in the extrusion of materials wherein a specific desired cross section is sought. The die comprises a center plate and one or more outer annular parts. Shaped holes, from which the material being extruded is emitted, are aligned at the respective edges of the center plate and the surrounding outer annular part. The die may be fabricated utilizing conventional equipment and may be employed to achieve extremely detailed cross sectional configurations of extruded materials.

6 Claims, 6 Drawing Figures

EXTRUSION DIE FOR SHAPED EXTRUDATE

BACKGROUND OF THE INVENTION

1. Field of the Invention

The present invention is directed to the extrusion of materials such as molten thermoplastics, solutions such as viscose-like solutions which upon extrusion may be solidified by passage into a coagulation bath, cellulose acetate, paste-like slurries of materials which, upon extrusion, may become hardened and further solidified by heating or calcining where it is desired to impart a particular cross sectional shape to the form which is being extruded. This is accomplished by a two-part die design wherein one part of the die is machined along its edge to provide one half of the desired shape and the second part of the die which cooperates with the first die part is machined with the complementing part of the desired shape.

2. Background of the Invention

In a common technique employed for the extrusion of plastic and thermoplastic materials, the material to be extruded is fed to the hopper of a rotating screw type extruder. The rotating screw carries the material along to the terminal end of the extruder where it is expressed through a die orifice of some type. The material may be melted during its transit along the rotating screw by the heat generated as the material is compacted and subjected to the friction which exists between the extruder barrel on the screw or the material may be positively heated while it is within the extruder by heating jackets arranged externally on the surface of the extruder barrel. Conversely, in those cases where undesirably high levels of heat are generated in situ by the material being advanced between the screw and the extruder barrel, the external surface of the extruder barrel may alternatively be cooled to control the temperature of the material within the extruder.

In the extrusion of, for example, plastic films, it is known to cause the material as it leaves the surface of the extruder screw to pass into a die body and be expressed therefrom through a pair of closely aligned lips whereby a thin film is produced. Such extrusion of a flat film is referred to as either film extrusion or casting, the latter expression being taken from the fact that on extrusion from the slit orifice the semi-molten film is cast upon the surface of an internally cooled rotating roller to further cool the film and set it.

In the extrusion of synthetic textiles, it is known to extrude materials such as cellulose acetate, nylon, polyester, acrylics, modified acrylics and the like through a die which is referred to as a spinnerette. The spinnerette is a plate, usually a metallic plate, which is affixed to the end of the extruder through which the extruded material passes. Generally the plates are characterized by having a plurality of small circular orifices therein whereby cylindrical shaped fibers are extruded through the spinnerette plate. It has been known in the past that often times it is desirable to alter this cylindrical cross sectional configuration of the synthetic fibers being produced by altering the shape of the orifice in the spinnerette plate. Accordingly, a square fiber, a crescent shaped fiber, a multi-lobal fiber, a hollow fiber, and the like may all be produced by causing a design change in the individual orifices of the spinnerette. The reasons for the various designed cross sectional configurations in the synthetic fiber may be to form fibrous material which has an improved loft or handle or, for example, to improve the filtration characteristics of fibers which may eventually be employed in filtration operations.

Other materials which may be extruded through the spinnerette like plates described hereinabove include aqueous slurries of, for example, materials which will eventually be employed as catalysts in, for example, crude or refined lubricant processing. For example, it is known to form catalyst extrudate by forming a hydrated, powdered mixture of alumina, either by itself, or in admixture with other materials such as zeolites. This powdered mixture is fed to the hopper of a rotating screw-type extruder. The material charged is passed along by virtue of the rotating screw as it is being compacted and pressed and heated within the confines of the extruder barrel. This results in the powder being transformed into a plastic high-solids content material which is extrudable. The extrudable material is passed through an orifice in a die face plate (e.g., a spinnerette) and it is subsequently heated to relatively high temperatures, i.e., calcined to solidify and harden the materials.

It has been known in the past to produce such catalytic material with non-cylindrical cross-sectional characteristics by shaping the orifice in the die plate in accordance with the shape of the cross section desired for the final catalyst particle. Cross sectional shapes such as multi-lobal, cloverleaf and the like are desirable in certain catalyst applications, such shapes have proven themselves to be resistant to crushing under the high operating pressures that are sometimes encountered in refining operations. These shapes additionally offer a low pressure drop environment and high diffusion rates which in most instances are quite desirable in refining operations. Additionally, such variations in cross-section results in an increased surface to mass ratio which is advantageous in those applications when increased surface areas improve the catalytic process. U.S. Pat. No. 3,764,565 discloses various useful shapes of catalyst particles which may be formed utilizing the present apparatus.

In order to achieve the desired cross sectional configuration, an extrusion die with shaped holes is needed which will extrude the non-conventional, non-cylindrical forms of the catalyst. It has been found that conventional drilling machines have very limited use in order to achieve a complex shaped hole penetration through the steel die face necessary for the fabrication thereof. Other machining techniques such as electrical discharge machining or laser drilling must be used for holes which are non-circular. Such techniques are time consuming and expensive, and while the former technique is applicable to metals only, the latter is effective for relatively thin plates of non-metallic materials, for example.

SUMMARY OF THE INVENTION

In accordance with the present invention, a unique design for an extrusion plate has been developed which may be fabricated utilizing conventional forming techniques. The die comprises at least two elements. An external plate which has an aperture in the center thereof and a central plate which is designed to mate with and fit into the central aperture in the external plate. The edges of the central plate are grooved, each groove forming a portion of the desired design at spaced apart locations around the edge of the central plate. Likewise, around the edges of the aperture in the central portion of the external plate are complementary grooves which when mated with the grooves of the center plate, will form the cross section which is desired. As hereinbefore noted, such a die apparatus may be produced utilizing conventional equipment, such as for example, a shaping tool whose cutting edge has a contour of part of a desired shape. The die may then be machined on a milling machine with a slotter attachment. As noted, the extrusion die comprises a center plate and one or more detachable external annular parts, each of which has grooves corresponding to one portion of a shaped hole at their mating edges. The mating edges are precisely formed whereby they fit to achieve a full-shaped cross section or aperture from which the catalyst may be extruded. In certain instances, in order to sustain the extrusion pressures encountered and to facilitate cleaning when disassembled, the external and internal plates may be taper-fit. Additionally, a support plate may be employed.

DESCRIPTION OF SPECIFIC EMBODIMENTS

Figure 1:
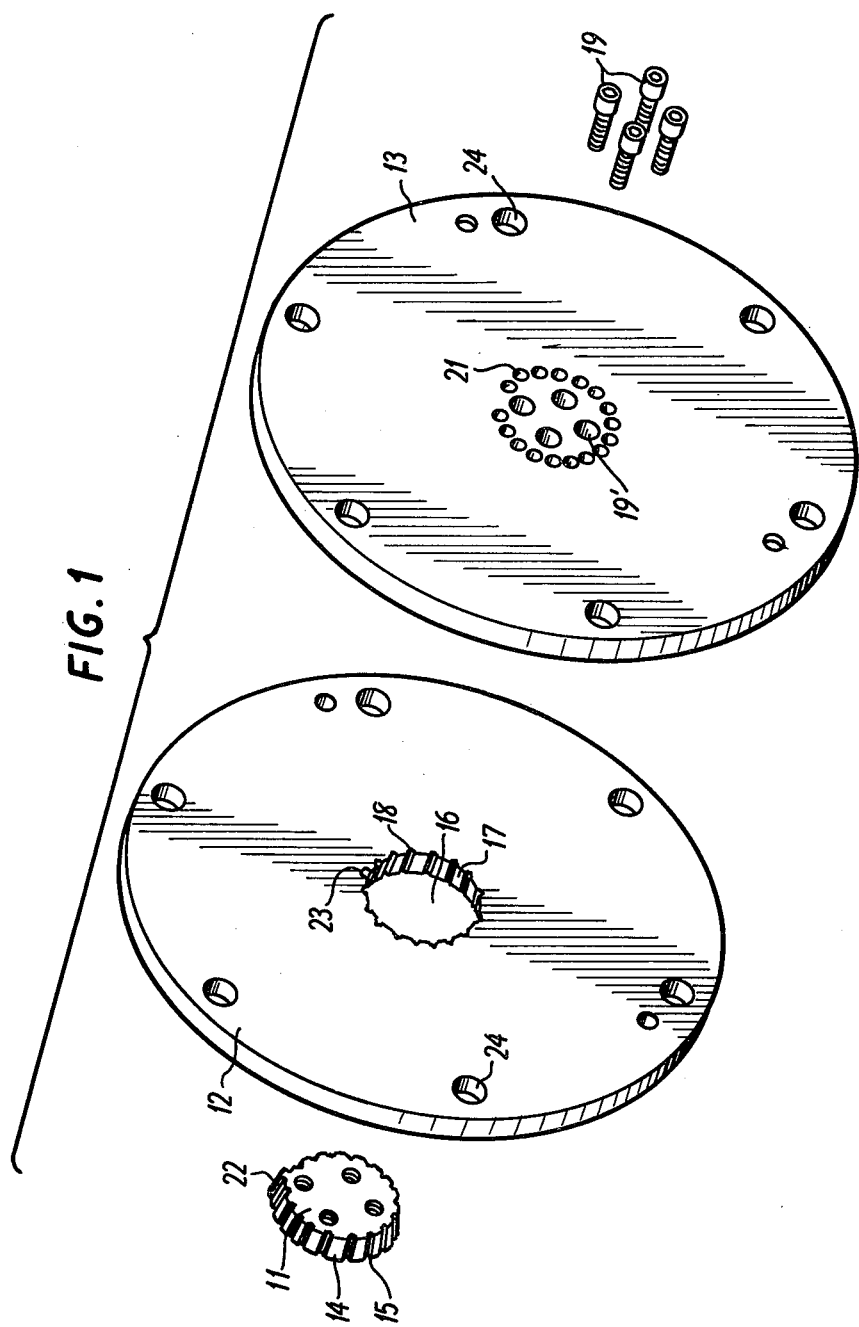
FIG. 1 is an exploded view of component parts of a die assembly example in accordance with the present invention.
Figure 3:
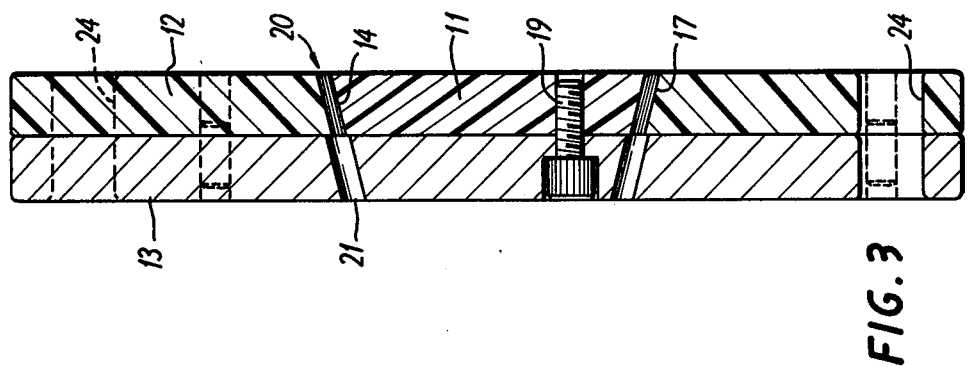
FIG. 3 is cross sectional view taken on line 3—3 of FIG. 2.
Figure 2:
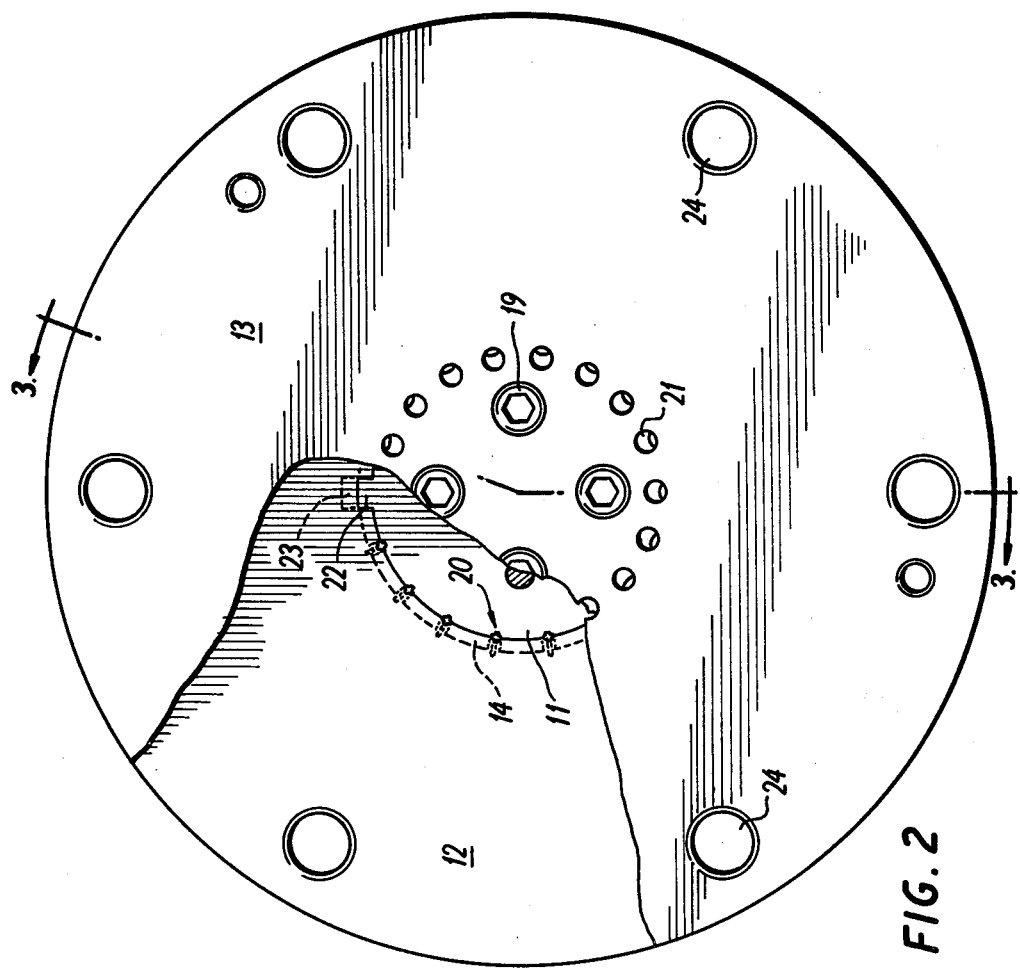
FIG. 2 is an overhead planar view, partially broken away, of an assembled die structure utilizing the component die structure parts shown in FIG. 1.
Figure 4:
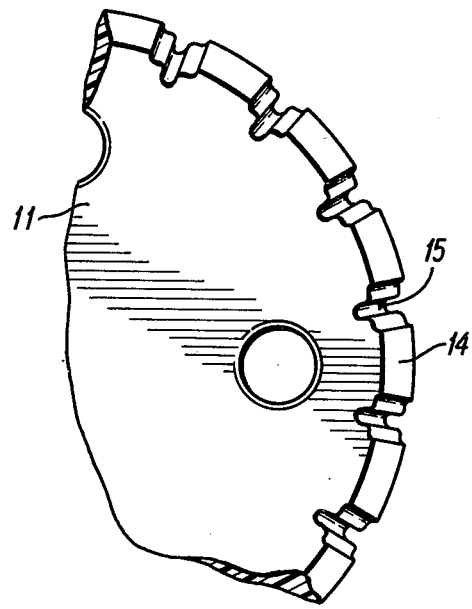
FIG. 4 is a fragmentary, enlarged view of a portion of the inner plate member shown in FIG. 1.
Figure 5:
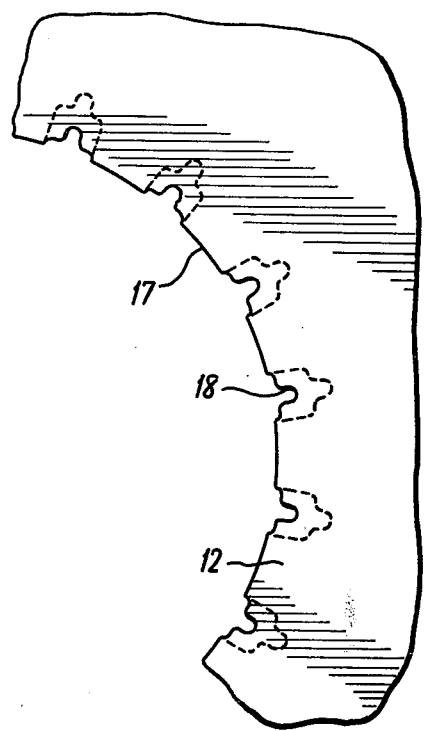
FIG. 5 is an enlarged, fragmentary view of a portion of the outer die plate shown in FIG. 1.
Figure 6:
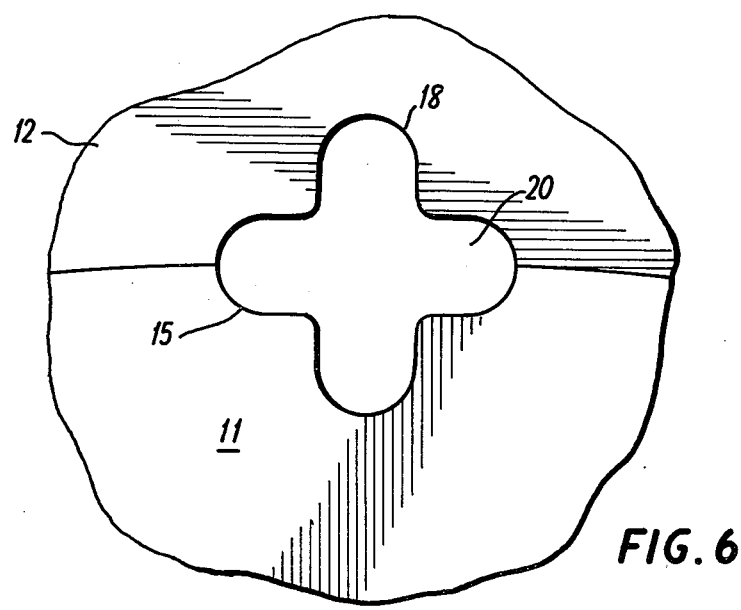
FIG. 6 is an enlarged, fragmentary view of one of the apertures formed by the joining edges of the inner plate and outer plate as shown in FIG. 2.

As shown in the exploded view of FIG. 1, a die assembly in accordance with the present invention may comprise inner plate 11, which is adapted to fit into the centrally located aperture 16 of outer plate 12. As shown in FIG. 1, the peripheral edge 14 of inner plate 11 may optionally be tapered to insure a snug fit into central aperture 18 of outer plate 12. Further, since the flow of material being extruded under pressure may tend to cause dislodgement of inner plate 11, the taper configuration resists this force. To insure proper support of inner plate 11 and outer plate 12 in assembled condition, a support plate 13 may be employed in the assembly contemplated within the scope of the present invention. In an assembled condition, support plate 13 bears flush against the inner plate 11 and outer plate 12 as shown in FIG. 3. Plate support orifice holes 21 are used to allow passage of the shaped extrudate as it emerges from the shaped orifice 20 formed by the mating of the outer peripheral edges 14 of inner plate 11, and the peripheral edge 17 of outer plate aperture 16. Retaining bolts 19 are adapted for insertion into retaining bolt holes 19', located in support plate 13 to secure the complete assembly. As shown in FIGS. 1 and 2, it is sometimes desirable to employ a locater lug 22 on the peripheral edge of inner plate 11 said lug 22 being slidingly engageable inside channel 23 of the peripheral edge 17 of outer plate aperture 16 to assure proper and permanent alignment of the spaced-apart and vertically-positioned recesses 15 with the spaced-apart and vertically-positioned recesses 18 and to insure a proper orifice configuration in order to achieve the desired cross-sectional shape of the extrudate. Holes 24 are provided around the outer periphery of plates 13 and 12 to accommodate support bolts for affixing the die assembly to the extruder.

The following Examples are intended to illustrate, in detail, a specific method for fabrication of a die apparatus embodiment in accordance with the present invention, as well as describing a typical extrusion operation. Accordingly, these Examples are by way of illustration and should not be construed in a limiting sense.

EXAMPLE 1

Die Fabrication Technique

A two-piece die plate, ⅜" thick, was fabricated using Delrin AF, a trademark of the DuPont Company for high-strength thermoplastic of polyoxymethylene filled with polytetrafluoroethylene fibers. The inner circular plate, 2" diameter with 10° edge taper, was cut and attached to an aluminum block. The fixture was mounted to the rotary table of a milling machine with a slotter attachment. At the periphery of the inner plate, 17 shaped grooves were cut with a shaping tool. Next, an 8 inch diameter outer plate was cut and a center opening with a 10° taper was bored so that the inner plate would fit the opening. Similarly, 17 shaped grooves were cut at the inner edge of the outer plate by milling machine and a slot for the alignment was also provided. In addition, six mounting holes near the outer edge were drilled. Finally, a support plate, which had 17 orifices, 6 mounting holes and four retaining bolt holes, was fabricated using cold-rolled steel. The inner and outer plates and the support plate were assembled to form the extrusion die as illustrated in the attached drawings.

Metals including brass, aluminum and stainless steels, and plastics, including acetal, nylon, phenolic, polyimide, polyester, and the like may also be used to fabricate the extrusion die.

EXAMPLE 2

Extrusion Method

Aggregates of NaZSM-5 zeolite, 1564.7 g, were mulled in a small batch mixer for 90 minutes to fine, uniform powders. To the zeolite, 997.0 g of alpha monohydrate alumina was added and the composition was mixed and mulled for 20 minutes. Deionized water, 1438.3 g, was then slowly added to the mix, after which mulling was continued for 30 minutes. By calculation, the extrusion mix contained 53% solid.

The mix was then fed at ambient temperature into the hopper of a 2" extruder, which has a screw L/D ratio of 10. A die plate with quadrulobe-shaped orifices, as described above, was used. The catalyst mix was compacted and mulled through the screw and extruded out of the die orifices.

Following the extrusion, the catalyst was dried overnight at 212° F. and stored. To make the finished catalyst, the dry extrudates are then ammonium exchanged and finally calcined in air.

It is to be understood that the foregoing is intended to be merely illustrative of certain specific embodiments of the disclosed invention. As those of skill in the art will readily appreciate, there are many variations which may be made on these specific embodiments without departing from the spirit of our invention and such variations are clearly to be encompassed within ambit of the following claims.

What is claimed is:

1. An extrusion die apparatus which comprises an outer plate and an inner plate, said inner plate adapted to be in mating engagement and in fixed concentric relation with a centrally located opening in said outer plate, said inner and outer plates being further characterized by having contacting mating edge surfaces which define, when in mating engagement and in concentric relation, at least one orifice, said inner and outer plates having radial lug means and mating female channel means whereby the mating of said lug with said channel aligns said inner and outer plates causing said orifice to be formed in a predetermined shape and location.

2. An extrusion die in accordance with claim 1 wherein said contacting surfaces form an annulus, said annulus characterized by having a series of apertures therein.

3. An extrusion die in accordance with claim 1 wherein said contacting surfaces cooperate to define at least one orifice, a part of said orifice being defined by said inner plate and a complementary portion of said orifice being defined by said outer plate.

4. An extrusion die in accordance with claim 1 wherein said contacting edge surfaces are spaced apart by a plurality of said orifices.

5. An extrusion die in accordance with claim 1 wherein said contacting edge surfaces form an orifice, said orifice having a cross-section shape selected from the group consisting of multilobal, clover-leaf, crescent, rectangular, triangular, circular, oval, T-shaped and hollow configurations thereof.

6. An extrusion die apparatus as claimed in claim 1 wherein said lug means is peripherally positioned on said inner plate.

* * * * *